United States Patent Office 2,983,706
Patented May 9, 1961

2,983,706

STABILIZING BROMINATED RUBBERY POLYMERS

Francis P. Baldwin, Colonia, Robert M. Thomas, Westfield, and Irving Kuntz, Roselle Park, N.J., assignors to Esso Research and Engineering Company, a corporation of Delaware No Drawing. Filed June 20, 1957, Ser. No. 667,034

8 Claims. (Cl. 260—45.7)

This invention relates to rubbery polymeric compositions containing partially brominated copolymers of isoolefins and multiolefins, particularly brominated butyl rubber, and to the stabilization of such compositions. It also relates to compositions containing partially brominated (hereinafter referred to as brominated) copolymers of isoolefins and multiolefins together with minor proportions of certain organic aromatic or heterocyclic stabilizers.

Copolymers of the general type hereinbefore mentioned, which are desirably brominated and stabilized with aromatic or heterocyclic compounds in accordance with the invention, especially where the copolymer comprises a major proportion (preferably about 85 to 99.5%) of a $C_4$ to $C_8$ isoolefin such as isobutylene, 2-methyl-butene-1 or 3-methyl butene-1, etc., with a minor proportion (preferably about 15 to 0.5 weight percent) of a multiolefin of about 4 to 14, preferably about 4 to 6 carbon atoms, are commonly referred to in patents and technical literature as "butyl rubber," or GR–I rubber (Government Rubber–Isobutylene), for example in textbook "Synthetic Rubber" by G. S. Whitby. The preparation of butyl rubber is also described in U.S. Patent 2,356,128 to Thomas et al. The multiolefin component of the copolymer is preferably a conjugated diolefin such as isoprene, butadiene, dimethylbutadiene, piperylene, or such multiolefins as cyclopentadiene, cyclohexadienes, myrcene, dimethallyl, allo-ocymene, vinyl fulvenes, etc. The copolymer comprising isobutylene and isoprene is preferred, although the copolymer may contain about 0.05 to 20.0, preferably about 0.2 to 5.0, parts by weight based on total reacting comonomers of such monoolefinic compounds as styrene, p-methyl styrene, alpha methyl styrene, indene, dihydronaphthalene, dichlorostyrene, p-chlorostyrene, mixtures thereof, etc.

Other copolymers which are desirably brominated and stabilized in accordance with the present invention include copolymers of 4-methyl-pentene-1, 2-ethyl butene-1, 4-ethyl pentene-1, or the like, as well as isobutylene or 3-methyl butene-1 with the following multiolefins:

(1) acyclic or open-chain conjugated diolefins such as 3-methyl pentadiene-1,3; hexadienes; 2-neopentyl-butadiene-1,3; and the like;

(2) alicyclic diolefins, both conjugated and non-conjugated such as 1-vinyl cyclohexene-3; 1-vinyl cyclobutene-2; dicyclopentadiene, diolefinic terpenes such as dipentene, terpinenes, terpinoline, phellandrenes, sylvestrene and the like;

(3) acyclic triolefins such as 2,6-dimethyl-4-methyleneheptadiene-2,5; 2-methyl hexatriene-1,3,5 and other conjugated triolefins such as ocimene;

(4) alicyclic triolefins such as fulvene; 6-6-dimethyl fulvene; 6-phenyl fulvene; tertiary alkyl fulvenes; 1,3,3-trimethyl-6-vinylcyclohexadiene-2,5; cycloheptatriene, etc., and (5) higher multiolefins such as 6,6-vinyl methyl fulvene (a tetraolefin) and 6,6-diisopropenyl fulvene (a pentaolefin) or the like.

In accordance with the present invention, it has now been found that while vulcanizates of isoolefin-multiolefin copolymers such as butyl rubber do not respond to stabilization by certain aromatic or heterocyclic stabilizing compounds, vulcanizates of the brominated derivatives of these copolymers are surprisingly improved by these stabilizing compounds as to resistance to oxidative degradation and as to heat aging resistance, particularly of the zinc oxide and/or primary or polyfunctional amine-cured vulcanizates or covulcanizates.

The brominated, rubbery isoolefin-multiolefin-containing copolymers, particularly brominated butyl rubbers, which are advantageously stabilized by aromatic or heterocyclic compounds in accordance with the present invention are derived from the foregoing isoolefin-multiolefin hydrocarbon copolymers. They are produced by carefully brominating these copolymers in a manner which does not degrade the molecular weight thereof, as more fully described hereinafter. The resulting brominated copolymers do not require sulfur or ultra-accelerators in their vulcanization and may be vulcanized solely by zinc oxide and/or primary or polyfunctional amines. The vulcanizates and covulcanizates with other rubbery polymers such as natural and GR–S rubbers formed have been found to exhibit good stress-strain properties and to have superior heat aging resistance compared to the corresponding unbrominated copolymers. Since these brominated copolymers already possess heat aging resistance superior to the unbrominated copolymers, and the unbrominated copolymers are not improved as to heat aging resistance by the addition thereto of aromatic or heterocyclic compounds herinafter more fully described, it is most unexpected that such aromatic or heterocyclic compounds have now been found to even further improve the heat aging resistance of the brominated copolymers.

Suitable processes for producing brominated isoolefin-multiolefin containing copolymers are by brominating butyl rubber or similar copolymers or tripolymers so as to contain about at least 0.5 weight percent (preferably at least about 1.0 weight percent) combined bromine but not more than about 3X weight percent combined bromine wherein:

$$X = \frac{79.92L}{(100-L)M_1 + L(M_2 + 79.92)} \times 100$$

and $L$ = mole percent of the multiolefin in the polymer,
$M_1$ = molecular weight of the isoolefin,
$M_2$ = molecular weight of the multiolefin,
$79.92$ = atomic weight of bromine.

Suitable brominating agents which may be employed are liquid bromine, alkali metal hypobromites, $C_4$ to $C_{10}$ tertiary alkyl hypobromites, sulfur bromides, pyridinium bromide perbromide, N-bromosuccinimide, alpha-bromo-aceto-acetanilide, N,N'-dibromo-5,5 dimethylhydantoin, tribromophenol bromide, N-bromoacetamide, beta-bromomethyl phthalimide, etc.

The bromination is generally conducted at temperatures above about 0° to about +200° C., preferably about 10° to 150° C., depending upon the particular brominating agent, for about one minute to several hours. An advantageous pressure range is from about 0.1 to 1000 p.s.i.a., atmospheric pressure being satisfactory. The bromination may be accomplished by brominating the solid rubbery copolymer per se or by preparing a 1 to 50 or 80 weight percent solution of such copolymers as above, in a substantially inert liquid organic solvent such as a $C_3$ to $C_8$ substantially inert hydrocarbon or halogenated derivative of saturated hydrocarbons; e.g., hexane, mineral spirits, cyclohexane, benzene, chlorobenzene, chloroform, carbon tetrachloride, mixtures thereof, etc., and adding thereto the brominating agent, which may optionally be in solution, such as dissolved in a substantially inert hydrocarbon, an alkyl chloride, carbon tetrachloride, carbon disulfide, benzene, etc.

The resulting brominated isoolefin-multiolefin-containing copolymer, particularly brominated butyl rubber, may be recovered by precipitation with oxygenated hydrocarbons, particularly alcohols or ketones such as acetone or any other known non-solvent for butyl rubber and dried under about 1 to 760 millimeters or higher of mercury pressure absolute at about 0° to 180° C., preferably about 50° to 150° C. (e.g. 70° C.). Other methods of recovering the brominated polymer are by conventional spray or drum drying techniques. Alternatively, the solution of the brominated butyl rubber may be injected into a vessel containing steam and/or agitated water heated to a temperature sufficient to volatilize the solvent and form an aqueous slurry of the brominated butyl rubber. The brominated butyl rubber may then be separated from this slurry by filtration and drying or recovered as a "crumb" or a dense sheet or slab by conventional hot milling and/or extruding procedures.

As so produced, the brominated rubbery polymer has a Staudinger molecular weight within the range between approximately 15,000 and 200,000, preferably about 25,000 to 100,000; and a mole percent unsaturation between about .05 to 15.0; preferably about 0.1 to 10.0. This copolymer, when cured, has a good elastic limit, tensile strength, abrasion resistance and flexure resistance and may be employed as an inner lining, tie ply, tread base, tread or sidewall in tires; in tire curing bags or bladders, in rubber belting, in air springs, in steam hose, as electrical insulation, in proofed goods, etc.

In practicing the present invention, the resulting unvulcanized brominated isoolefin-multiolefin-containing copolymer, prior to curing, is blended at a temperature between about 0° and 200° C., advantageously about 10° to 150° C., preferably about 10° to 50° C., with about 0.02 to 20, advantageously about 0.05 to 10.0, preferably 0.1 to 5.0 weight percent of one or more of the organic aromatic or heterocyclic stabilizing compounds enumerated hereinafter. This may be accomplished in several manners. In a preferred embodiment of the invention, at least about ⅛ to ⅞ of the organic stabilizing compound required is blended with the unvulcanized brominated copolymer slurry when the copolymer is recovered (i.e., precipitated and/or injected into a hot aqueous medium) but prior to the drying, milling and/or extruding steps and the rest added at a later stage prior to vulcanization. In another preferred embodiment, at least about ¼ to ¾ of the organic stabilizing compound required is added to the brominated copolymer solution prior to recovering the copolymer by spray drying and/or drum drying and/or precipitation and/or injection into a hot aqueous medium. Alternatively, a sufficient portion of the organic compound may be added at any of the stages in processing hereinbefore mentioned that additional stabilizer need not be blended with the dry brominated copolymer on a rubber mill (or similar mixing means such as a Banbury mixer) prior to vulcanization.

It is less preferred to add all of the organic stabilizing compound or compounds on the mill or Banbury just prior to vulcanization. More particularly, it is especially desirable to blend with the brominated copolymer at least 0.1 part, per hundred parts of copolymer, of at least one of the organic stabilizing compounds prior to such finishing operations as spray drying, drum drying, hot milling, extruding or calendering, since the organic stabilizing compound substantially prevents degradation or breakdown of the brominated copolymer during these operations.

The organic stabilizing compounds employed in accordance with the present invention may have boiling points between about 100° and 700° C. and are chosen from the four categories enumerated hereinafter, the members of all of which may be used singly or in combination:

(I) Aromatic or heterocyclic compounds containing directly attached to the ring at least one (preferably 1 to 5) hydroxyl radical and at least one (preferably 1 to 8) substituent selected from the group consisting of alkyl, alkaryl, aryl, aralkyl, cycloalkyl, alkoxy, aryloxy, aroyl, acyl, acyloxy and mixtures thereof, said substituent containing between about 1 and 24, preferably 1 to 18 carbon atoms. The total number of carbon atoms present in such compounds is generally between about 7 and 60, advantageously 7 to 48, preferably 8 to 42. Typical compounds falling within this category include 2,6-ditertiary butyl-4-methyl phenol; 2,2'-methylene-bis (4-methyl-6-tertiary butyl phenol); p-phenylphenol; p-hydroxyl-N-phenyl morpholine; hydroquinone monobenzyl ether; etc.

(II) Aromatic or heterocyclic amines such as substituted or unsubstituted mono or poly secondary amines having 1 to 5 nitrogen atoms and containing attached to at least one nitrogen and/or carbon atom at least one (preferably 1 to 8) substituent having about 1 to 24, preferably about 1 to 18 carbon atoms; the substituents and total number of carbon atoms present in such compounds being as set forth for the compounds of category (I). Typical compounds falling within category (II) include phenyl-beta-naphthylamine; N,N'-diphenyl-p-phenylene diamine; N,N'-dioctyl p-phenylene diamine; 4,4'-dimethoxy diphenylamine; diortho tolyl ethylene diamine; etc.

(III) Aromatic or heterocyclic compounds containing at least one (preferably 1 to 5) hydroxyl group and at least one primary (or preferably secondary) amino group, said compounds preferably having about 1 to 5 nitrogen atoms and containing attached to at least one nitrogen and/or carbon atom at least one (preferably 1 to 8) substituent having about 1 to 24, preferably about 1 to 18 carbon atoms; the substituents and total number of carbon atoms present in such compounds being as set forth for the compounds of category (I). Typical compounds falling within category (III) include N-lauroyl-p-aminophenol; N-stearoyl-p-aminophenol; N-dodecanoyl-1-hydroxy-4-aminonaphthalene; N-hexanoyl-2-amino-4-n-octyl phenol; etc.

(IV) Reaction products of the compounds of category (I) and/or unsubstituted hydroxy-aromatics such as phenol, naphthol, bisphenols and xylenols and/or unsubstituted hydroxy-heterocyclics such as pyridine, quinoline or the like and/or the compounds of category (III), with aldehydes and/or ketones having about 1 to 20, preferably about 1 to 8 carbon atoms. Typical compounds falling within category (IV) include aldol-alpha-naphthylamine reaction products; reaction products of a diphenylamine and acetone; diarylamine-ketones; reaction product of acetone and p-aminodiphenyl; p-hydroxy phenyl morpholine; aniline-acetaldehyde reaction products; etc.

The foregoing compositions comprising brominated isoolefin-multiolefin-containing copolymers and organic stabilizing compounds, may be hot-milled, extruded, calendered or dried with facility, in accordance with conventional practice, without thermal degradation. One hundred parts by weight of these resulting compositions are then advantageously compounded with about 10 to 150 parts by weight of a filler or fillers; about 1 to 30 parts by weight of zinc oxide and/or primary or polyfunctional amines; plasticizers such as hydrocarbon oils, tars, waxes, resins or organic esters; pigments; magnesium oxide and/or calcium oxides; with, in certain instances, the addition of non-ultra type accelerators such as mercaptobenzothiazole, benzothiazyl disulfide, etc. The compounded stock formed may then be vulcanized at temperatures between about room temperature and 450° F., preferably about 250° to 400° F., for times between about a few seconds to several days, preferably 0.5 to 90 minutes, depending upon the particular curatives used, the nature of the brominated isoolefin-multiolefin copolymer, whether other rubbery polymers (e.g. natural rubber, rubbery diene-styrene copolymers, polyhaloalkadiene rubbers, etc.) are being covulcanized therewith, the intended use of the vulcanizate or covulcanizate, etc. In general, the higher the vulcanization temperature, the shorter may be the curing time and vice versa.

One particularly useful formulation for compounding the unvulcanized stabilized brominated isoolefin-multiolefin-containing copolymer, particularly brominated butyl rubber, for use in the tie plys, carcass constructions, or tubeless tire inner linings, is as follows or its equivalent. It will be noted that the formulation may be free of added elemental sulfur and sulfur-containing ultra-type-accelerators (i.e., derivatives of thiuram and carbamic acids).

| Component | Parts by weight | |
|---|---|---|
| | Typical Range | Preferred Range |
| Brominated butyl rubber | 100 | 100 |
| Tackifier (e.g. phenolic-aldehyde resin) | 0–40 | 1–15 |
| Hydrated silica (e.g. Hi-Sil-202) [1] | 0–100 | 10–75 |
| Plasticizer oil [2] | 0–50 | 5–35 |
| Stabilizer | 0.05–20.0 | 0.1–5.0 |
| Carbon black (e.g., MPC black) | 0–150 | 10–75 |
| Accelerator (e.g., benzothiazyl disulfide) | 0–10.0 | 0–5.0 |
| Diamine curing agent (e.g., hexamethylene diamine) | 0–20 | 1–10 |
| Basic metal compound (e.g., zinc oxide) | 0.5–50.0 | 1.0–30.0 |
| Phenol dialcohol resin (e.g., 2,6-dimethylol-4-octyl phenol resin) | 0–20.0 | 0.1–15.0 |

[1] Hi-Sil-202 is a pigment of very fine particle size of precipitated, hydrated silica having the properties listed below:

Property:
| | Value |
|---|---|
| Bulk density (lbs. per cubic foot) | 8.0 |
| Specific gravity | 1.95 |
| Average particle size (millimicrons) | 22 |
| Moisture (percent) | 5 |
| pH | 7.5 |
| Refractive index | 1.46 |
| Ignition loss (percent max.) | 10 |
| $SiO_2$ (percent) | 84 |
| CaO (percent) | 1.0 |
| NaCl (percent max.) | 1.0 |
| $Fe_2O_3$ (percent max.) | 0.3 |
| $Al_2O_3$ (percent max.) | 4.0 |

[2] The plasticizer oil is preferably a hydrocarbon oil derived from a paraffinic or naphthenic base crude having the following characteristics:

| Property | Preferred Range | Typical Range |
|---|---|---|
| Specific gravity | 0.7–1.0 | 0.85–0.97 |
| Flash point, °F. (open cup method) | 350–600 | 400–550 |
| Viscosity, SSU: | | |
| @100° F | 200–1500 | 300–1,000 |
| @ 210° F | 10–400 | 30–200 |
| Iodine number (cg./g.) | 0–40 | 0–20 |

The uncured, brominated butyl rubber may also be blended with about 0.5 to 10%, of a group II metal silicate, particularly calcium silicate, and/or with about 1 to 5% of an adsorbent deactivator such as various high boiling polar compounds, e.g., ethylene glycol, during or preferably before the brominated butyl rubber is compounded with the hydrated silica and curatives.

The amount of hydrated silica added, per 100 parts by weight of brominated butyl rubber is generally about 10 to 75, preferably about 20 to 40 parts by weight for the tie ply compositions, and somewhat higher, say about 20–100, preferably about 30–75 parts for compositions suitable for inner linings of tires. To the composition, containing about 10 to 100 parts by weight of hydrated silica, may also be blended about 10 to 150 parts by weight of a carbon black, either a thermal, furnace or channel black, or combinations thereof depending on the end use to which the product will be put. For some applications, about 0 to 200, preferably about 50 to 150 parts by weight of an additional mineral filler may be desirably employed. Such fillers include diatomaceous earth, montmorillonites, hard clays, soft clays, talc, lithopone, barytes, or alumina, etc.

Vulcanization of such compositions as the foregoing, when used in tie plies is generally for about 1 to 200 minutes at temperatures in the range of between about 250° to 400° F., preferably about 270° to about 380° F.

In order to more fully illustrate the present invention, the following experimental data are given:

*Example I*

A run is made brominating butyl rubber. The butyl rubber employed is a commercial butyl rubber produced by employing in the polymerization feed about 2.5 weight percent isoprene and about 97.5% isobutylene. The rubber has an eight minute Mooney viscosity at 212° F. of 71.0, a mole percent unsaturation of 1.47, and a viscosity average molecular weight of 420,000.

The bromination of a solution of the above uncured butyl rubber is conducted in a 50-gallon glass-lined Pfaudler reactor equipped with agitator and baffle.

The solvent for the butyl rubber is as follows:

| Component: | Volume percent |
|---|---|
| 2,2-dimethyl butane | 0.1 |
| 2,3-dimethyl butane | 2.40 |
| 2-methyl pentane | 10.75 |
| 3-methyl pentane | 12.45 |
| n-Hexane | 44.85 |
| Methyl cyclopentane | 20.5 |
| 2,2-dimethyl pentane | 0.4 |
| Benzene | 7.7 |
| Cyclohexane | 0.85 |

Liquid bromine is continuously added to the butyl rubber solution over a period of 10 minutes at 30° C. and under atmospheric pressure. The agitated solution is then allowed to stand for an additional 50 minutes. The resulting solution of brominated butyl rubber is then water-washed three times to remove dissolved hydrogen bromide. There is then added 0.2 pounds of a stabilizer 2,2'-methylene bis(4-methyl-6-tertiary butyl phenol) per 100 pounds of the polymer in accordance with the invention. The solution is then filtered to remove impurities.

The resulting water-washed solution containing the brominated rubbery butyl product of Example I is then recovered by injecting the dissolved brominated polymer into an agitated aqueous solution containing a commercial wetting agent of the aliphatic polyoxyethylene ether type (Sterox AJ) in an amount of 64 cc. per 100 pounds of brominated butyl rubber as a dispersing aid and one pound of zinc stearate per 100 pounds of brominated butyl rubber, the hot agitated aqueous solution being employed in an amount of 500 gallons per 100 pounds of rubber.

The agitated solution is maintained at a temperature between about 160° to 170° F. (e.g., 165° F.) whereby to flash off the hydrocarbon solvent and form an aqueous slurry of the brominated butyl rubber in water. This slurry is then filtered and the brominated butyl rubber, which is in the form of a wet "crumb" is placed in a tray drier maintained at 210° F. and dried for six hours. The crumb is then completely dried and compacted by milling for eight minutes on a conventional rubber mill having a roll temperature of 250° F. The brominated butyl rubber as recovered has a viscosity average molecular weight of 370,000 and contains 2.1 weight percent bromine.

One hundred parts by weight of the resulting stabilized brominated butyl rubber of Example I are then compounded on a two roll commercial rubber mill at a roll temperature of 100° F. with the following:

| Component: | Parts by weight |
|---|---|
| Zinc oxide | 5 |
| Carbon Black (SRF) | 50 |
| Stearic acid | 1 |

The compounded, stabilized, brominated butyl rubber blend formed is then cured for 60 minutes at 287° F. in order to vulcanize the same, the following physical inspections being noted:

|   | Above |
|---|---|
| Tensile strength (p.s.i.) | 1000 |
| Modulus at 300% elongation (p.s.i.) | 500 |
| Elongation at break (percent) | 300 |

The above data show that brominated butyl rubber, stabilized in accordance with the invention (e.g., in this case, prior to drying and hot milling) cures into a vulcanizate having good stress-strain properties. This vulcanizate, when aged in a mold at 300° F. for 48 hours, is not cracked or crazed, has stress-strain properties of the same order of the unaged vulcanizate and exhibits slightly less swell in cyclohexane than does the unaged material.

*Example II*

One hundred parts by weight of a brominated butyl rubber having a viscosity average molecular weight of 370,000 and a bromine content of 2.1 weight percent were compounded on a cold rubber mill with 50 parts by weight of SRF carbon black, 0.5 part by weight of stearic acid, and additionally as follows. The resulting stabilized, compounded, brominated butyl rubber blends were then cured for 60 minutes at 307° F., the following physical inspections being noted. The physical inspections for samples of each vulcanizate aged in a circulatory air oven at 300° F. for 48 hours are also tabulated below:

| Component | Parts by weight | | | | |
|---|---|---|---|---|---|
|   | Control A | Sample 1 | Sample 2 | Control B | Sample 3 |
| Zinc oxide | 5.0 | 5.0 | 5.0 |   |   |
| Stabilizer, i.e. 2,2′-methylene-bis (4-methyl-6-tertiary butyl phenol) |   | 1.0 |   |   | 1.0 |
| Stabilizer (i.e., phenyl beta-naphthylamine) |   |   | 1.0 |   |   |
| Magnesium Oxide |   |   |   | 5.0 | 5.0 |
| Diethylene triamine |   |   |   | 2.0 | 2.0 |
| Unaged Vulcanizates: |   |   |   |   |   |
| Tensile strength (p.s.i.) | 1,780 | 1,750 | 1,540 | 1,250 | 1,070 |
| Elongation (percent) | 540 | 530 | 440 | 120 | 120 |
| Modules at 300% Elongation (p.s.i.) | 1,040 | 980 | 1,200 |   |   |
| Aged Vulcanizates: |   |   |   |   |   |
| Tensile strength (p.s.i.) | 680 | 850 | 800 | 610 | 720 |
| Elongation (percent) | 470 | 365 | 345 | 110 | 130 |
| Modules at 300% Elongation (p.s.i.) | 460 | 740 | 800 |   |   |

The above data show that brominated butyl rubber vulcanizates, stabilized in accordance with the present invention, exhibit better tensile strength upon thermal aging than vulcanizates containing no added aromatic or heterocyclic stabilizer (i.e., samples 1 and 2 compared to control A for zinc oxide cured vulcanizates, or sample 3 compared to control B for amine cured vulcanizates).

Resort may be had to various modifications and variations of the foregoing disclosed specific embodiments and examples without departing from the spirit of the invention or the scope of the appended claims.

What is claimed is:

1. A composition stabilized against thermal degradation comprising a brominated rubbery copolymer of 85 to 99.5 weight percent of a $C_4$ to $C_8$ isoolefin and 15 to 0.5 weight percent of a $C_4$ to $C_{14}$ multiolefin, said brominated copolymer having a Staudinger molecular weight above about 10,000 and a mole percent unsaturation of from about 0.1 to 15.0 and containing at least about 0.5 weight percent bromine but not more than 3 combined atoms of bromide per double bond in said copolymer and about 0.1 to 20.0 parts by weight per 100 parts of brominated copolymer of a stabilizer selected from the class consisting of 2,6-di-tert-butyl-4-methyl phenol, 2,2′-methylene-bis(4-methyl-6-tert-butyl phenol), phenyl-beta-naphthyl- amine and N,N′-di-beta-naphthyl-p-phenylene diamine.

2. Composition according to claim 1 in which the stabilizer is 2,6-ditertiary butyl-4-methyl phenol.

3. Composition according to claim 1 in which the stabilizer is phenyl-beta-naphthylamine.

4. Composition according to claim 1 in which the stabilizer is N,N′-di-beta-naphthyl-p-phenylene diamine.

5. Composition according to claim 1 in which the stabilizer is 2,2′-methylene-bis-(4-methyl-6-tertiary butyl phenol).

6. A composition according to claim 1 in which the isoolefin is isobutylene, the multiolefin is isoprene and the stabilizer is 2,2′ - methylene - bis(4-methyl-6-tert-butyl phenol).

7. A process for producing vulcanizates of brominated butyl rubber stabilized against thermal degradation which consists essentially of dissolving a copolymer of 85 to 99.5 weight percent of a $C_4$ to $C_8$ isoolefin and 15 to 0.5 weight percent of a $C_4$ to $C_{14}$ multiolefin in a solvent, brominating the copolymer to contain at least 0.5 weight percent bromine but not more than about 3 atoms combined bromine per double bond in said copolymer, adding thereto about 0.5 to 20 parts by weight per 100 parts of brominated copolymer of a stabilizer selected from the class consisting of 2,6-di-tert-butyl-4-methyl phenol, 2,2′-methylene-bis(4-methyl-6-tert-butyl phenol), phenyl-beta-naphthylamine and N,N′-di-beta-naphthyl-p-phenylene diamine, recovering the stabilized brominated copolymer from the solution, and curing the resulting mixture at a temperature between 250° and 400° F., in the presence of about 2 to 30 parts by weight of a basic metal compound and about 0 to 20 parts by weight of an amino compound selected from the group consisting of primary amines, polyfunctional amines and mixtures thereof but in the absence of sulfur.

8. A process for making improved vulcanizate compositions of brominated isobutylene-isoprene copolymers of low unsaturation, having improved resistance to degradation by thermal aging, which comprises brominating a rubbery copolymer of about 2.5% isoprene and about 97.5% isobutylene, in solution in an inert volatile hydrocarbon solvent, using elemental bromine as brominating agent, to incorporate about 2.1% of bromine in the copolymer, adding about 0.2 part by wt. of 2,2′-methylene bis (4-methyl-6-tertiary butyl phenol) as stabilizer per 100 parts of said copolymer, then discharging the resulting solution into hot water containing a slurrying agent to volatilize said hydrocarbon solvent and to produce a slurry of stabilizer-containing brominated copolymer in water, filtering and drying, compounding the resulting dry stabilized brominated rubbery copolymer with a filler and with zinc oxide, and curing the resulting mixture at a temperature of about 250–400° F. in the absence of sulfur.

(References on following page)

References Cited in the file of this patent

UNITED STATES PATENTS

| | | | |
|---|---|---|---|
| 2,631,984 | Crawford et al. | Mar. 17, 1953 |
| 2,698,041 | Morrissey et al. | Dec. 28, 1954 |
| 2,720,479 | Crawford et al. | Oct. 11, 1955 |
| 2,732,354 | Morrissey et al. | Jan. 24, 1956 |
| 2,816,098 | Morrissey | Dec. 10, 1957 |
| 2,820,774 | Meyer | Jan. 21, 1958 |
| 2,833,734 | Morrissey et al. | May 6, 1958 |